United States Patent [19]

Laughton et al.

[11] Patent Number: 5,023,422
[45] Date of Patent: Jun. 11, 1991

[54] METHOD OF AND APPARATUS FOR FORMING A SLOT IN A WORKPIECE

[75] Inventors: Laurence J. Laughton, Keighley; Edward Ratcliffe, Colne, both of England

[73] Assignee: Rolls-Royce plc, London, England

[21] Appl. No.: 484,832

[22] Filed: Feb. 24, 1990

[30] Foreign Application Priority Data

Mar. 31, 1989 [GB] United Kingdom ............... 8907328

[51] Int. Cl.$^5$ .............................................. B23H 9/14
[52] U.S. Cl. ............................... 219/69.2; 204/129.55; 204/129.7; 204/224 M; 219/69.17; 408/704; 408/705
[58] Field of Search .................. 219/69.2, 69.17, 69.15, 219/69.13, 69.16, 121.7, 121.71, 121.19, 121.2, 121.4, 121.41, 69.11; 204/129.5, 129.55, 129.7; 408/131, 154, 17, 64, 65, 704, 705; 51/165.79, 165.89, 215 CP, 281 P

[56] References Cited

U.S. PATENT DOCUMENTS

| 4,150,275 | 4/1979 | Wavre | 219/69.2 |
| 4,188,522 | 2/1980 | Baker | 219/69.17 |
| 4,393,292 | 7/1983 | Inoue | 219/69.17 |
| 4,430,180 | 2/1984 | Shimizu | 219/69.17 |
| 4,431,897 | 2/1984 | Ito | 219/69.17 |
| 4,455,469 | 6/1984 | Inoue | 219/69.17 |
| 4,476,369 | 10/1984 | Inoue | 219/69.17 |
| 4,697,964 | 10/1987 | Daiko et al. | 408/704 |
| 4,922,076 | 5/1990 | Cross et al. | 219/69.17 |

FOREIGN PATENT DOCUMENTS

| 178123 | 8/1986 | Japan | 219/69.15 |
| 178124 | 8/1986 | Japan | 219/69.11 |

Primary Examiner—Geoffrey S. Evans
Attorney, Agent, or Firm—Cushman, Darby & Cushman

[57] ABSTRACT

A machine tool produces a tapered slot by moving a tool laterally of the workpiece as well as directly into it. The lateral movement is shortened at the end of each half reciprocation, so as to form the taper. The shortened stroke is achieved by use of electronic circuitry in which transducers are utilized to indicate by voltage output, the magnitude of movement of the tool into the workpiece relative to the magnitude of the movement of the tool laterally thereof and on positive or negative numerical pair being noted, deriving a further signal therefrom and utilizing it to change the direction of reciprocation.

10 Claims, 4 Drawing Sheets

METHOD OF AND APPARATUS FOR FORMING A SLOT IN A WORKPIECE

BACKGROUND OF THE INVENTION

The present invention relates to a method of forming a slot of varying cross-section in a workpiece.

The invention also relates to apparatus for achieving the aforementioned aperture.

Previous attempts to provide a machine tool with which to produce a slot or recess in a workpiece, which slot or recess has a varying cross-section, are typified in published specifications GB2061141 and GB2092048. The arrangement disclosed in the former specification suffered wear through friction. The arrangement disclosed in the later specification is controlled by a numerical control system and numerous motors and is consequently expensive.

The example in GB2061141 is effectively a self contained machine tool in that it is movement of the electrode vertically downwards, which brings about varying reciprocatory movement of the workpiece laterally thereof, by varying the angle of a swashplate with respect to a pin which engages it and is caused to orbit by a motor.

SUMMARY OF THE INVENTION

The present invention seeks to provide an improved method of forming an aperture of varying cross sectional area.

The invention further seeks to provide improved apparatus for achieving the method.

According to one aspect of the present invention, a method of forming a tapered slot in a workpiece comprises the steps of moving a tool into the workpiece to achieve a desired depth and at the same time causing relative reciprocatory movement between the tool and the workpiece in directions laterally of the direction of movement of the tool into the workpiece and deriving electrical signals from said movements and wherein the signals derived from movement of the tool into the workpiece constantly reduce in magnitude, comparing said signals with each other and when the signals derived from said lateral movement have a value equal to the value of the signals derived from the movement of the tool into the workpiece or equal to a corresponding negative value thereof, deriving a further signal therefrom and utilizing said further signal to effect a reversal in the direction of said lateral movement between the workpiece and the tool.

A further aspect of the present invention provides a tapered slot forming apparatus comprising a tool holder and tool which in operation are movable towards a workpiece, first signal generating means adapted to produce a signal of reducing magnitude on said movement occurring, said tool holder further being capable of reciprocating movement relative to and laterally of a said work-piece, second signal generating means adapted to produce positive and negative signals on alternate relative half reciprocations of said tool holder, the maximum numerical magnitude reached by said positive and negative signals being equal to the signals produced by said first signal generating means, means for monitoring said positive and negative signals relative to said reducing signal and adapted so as to emit a signal on noting numerical equality therebetween and further means actuated by said emitted signal either to reverse the direction of relative lateral movement of the tool holder or to disable the machine tool thereby.

BRIEF DESCRIPTION OF THE DRAWINGS

The invention will now be described, by way of example and with reference to the accompanying drawings in which.

DETAILED DESCRIPTION OF THE EMBODIMENTS

Figure 1:
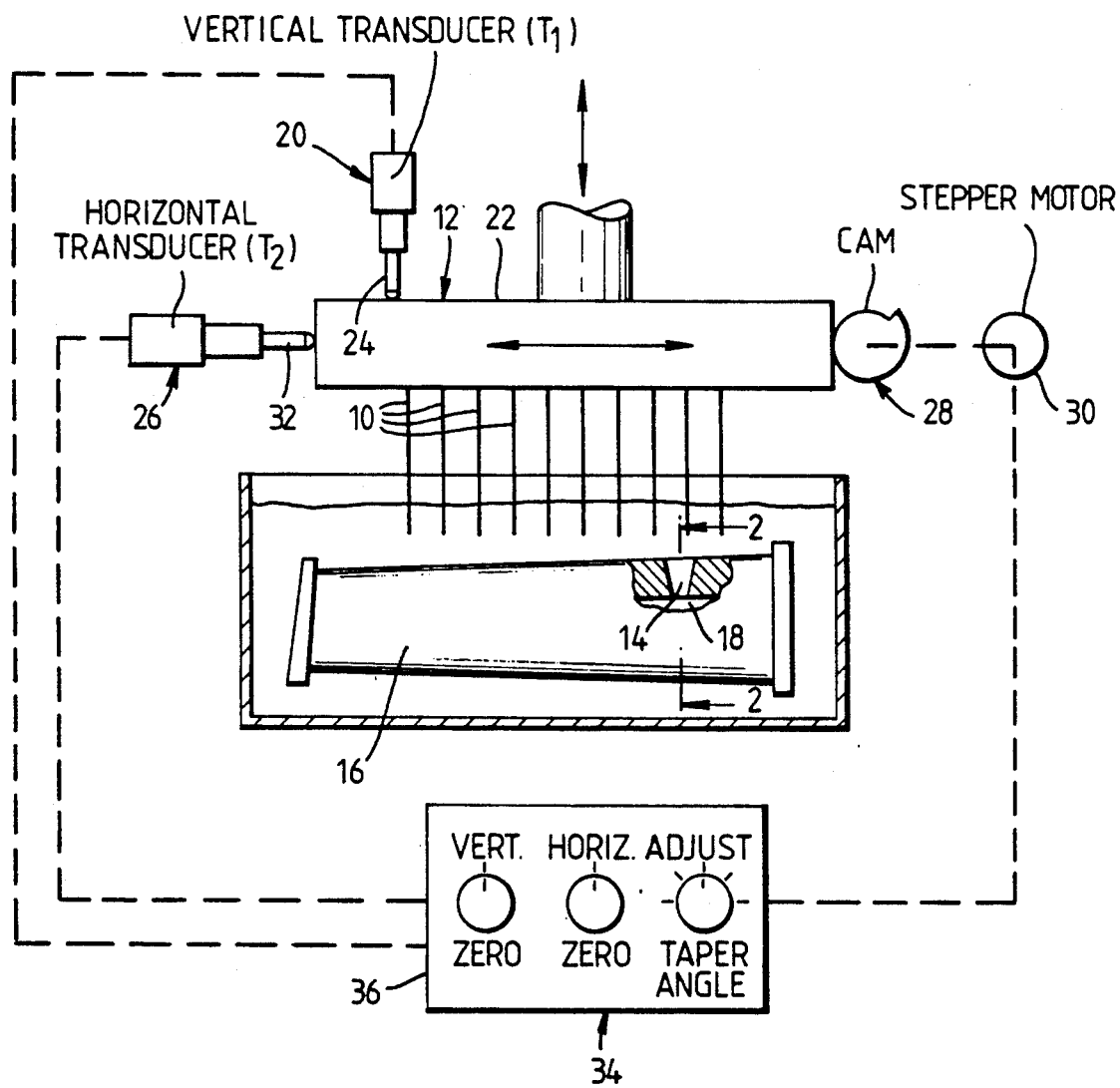
FIG. 1 is a diagrammatic representation of a machine tool in accordance with an aspect of the present invention.

Referring to FIG. 1. An array of electro discharge electrodes 10 are arranged in a common holder 12, known as a comb. Each electrode the array 10 is required to machine a respective slot 14 only one of which is shown, in a workpiece 16. The actual electro erosion process which the present example of the invention utilizes is well known and will not be described herein. The manner of operation by which the profile of the slot produced thereby is achieved however, is not known.

Figure 2:
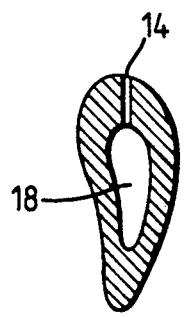
FIG. 2 is a view on line 2—2 in FIG. 1.

As is seen in FIG. 1, the slot 14 is tapered in the plane of the drawing. Referring briefly to FIG. 2, the slot 14 is seen to be of constant width in a plane normal to the plane mentioned hereinbefore.

Referring back to FIG. 1. The tapered profile is achieved by reciprocating the comb 12 in directions laterally of the direction of movement of the electrodes 10 into the workpiece 16 and reducing the length of each half reciprocation, until breakthrough of the electrodes 10 into a passage 18 which extends lengthwise of the workpiece 16. The arrangement is such that breakthrough occurs as the electrodes 10 reach the mid point of their respective reciprocatory movements and this is achieved in the manner described hereinafter.

A transducer 20 engages the upper surface 22 of the electrode holder 12 and, as the comb 12 moves downwards in known reciprocatory manner the lower portion 24 of the transducer extends with it. The transducer translates the downwardly extending movement into an electrical signal which at initiation of the movement, is some pre-selected positive voltage value, which value reduces as the extension of the transducer continues, until it reaches zero. This coincides with the aforementioned breakthrough of the electrodes 10 into the passage 18, at the apex of the taper.

A second transducer 26 is positioned so as to engage an end of the comb 12, and a cam 28 which is connected for rotation by a stepper motor 30, engages the opposite end thereof.

The second transducer 26 includes a portion 32 which is caused alternately to telescope and extend when the cam 28 is rotated by the motor 30, first in one direction and then the other direction. The second transducer 26 also generates a voltage, the magnitude of which varies with the extension and telescoping movement of the portion 32. The operation of the first and second transducers 20 and 26 is such that when the positive voltage output of the second transducer 26 equals the positive voltage then generated by the first transducer 20, the direction of motion of the comb 12 is caused to reverse, and when the negative voltage output of the second transducer 26 numerically equals the positive voltage output of the first transducer 20, the direction of motion of the comb 12 is again reversed. Each reversal is brought about by a change in direction of rotation of the cam 28.

Since the voltage output of the first transducer 20 is constantly reducing, it follows that the second transducer output will ever more quickly reach a corresponding positive or negative value. This results in the reciprocatory movements of the comb 12 and its associated electrodes 10 becoming shorter and shorter, thus forming the tapered profile which is depicted in the slot 14 in FIG. 1.

Since the voltage output of the second transducer 26 fluctuates between positive and negative values, the voltage output thereof always passes through zero value. The arrangement of the circuitry is such that when the output of both transducers 20 and 26 coincide at zero, the electrodes will be on the centre line of the slot 14 and at the same time, will complete breakthrough into the passage 18. At that point, a machine tool disabling signal is generated, which stops the operation.

The desired relationship between the voltage values generated by the transducers 20 and 26, is achieved via a setting control box 34 which includes a setting control knob and associated circuitry for each transducer and a further control knob and associated circuitry for controlling the taper angle to be formed.

Figure 3:
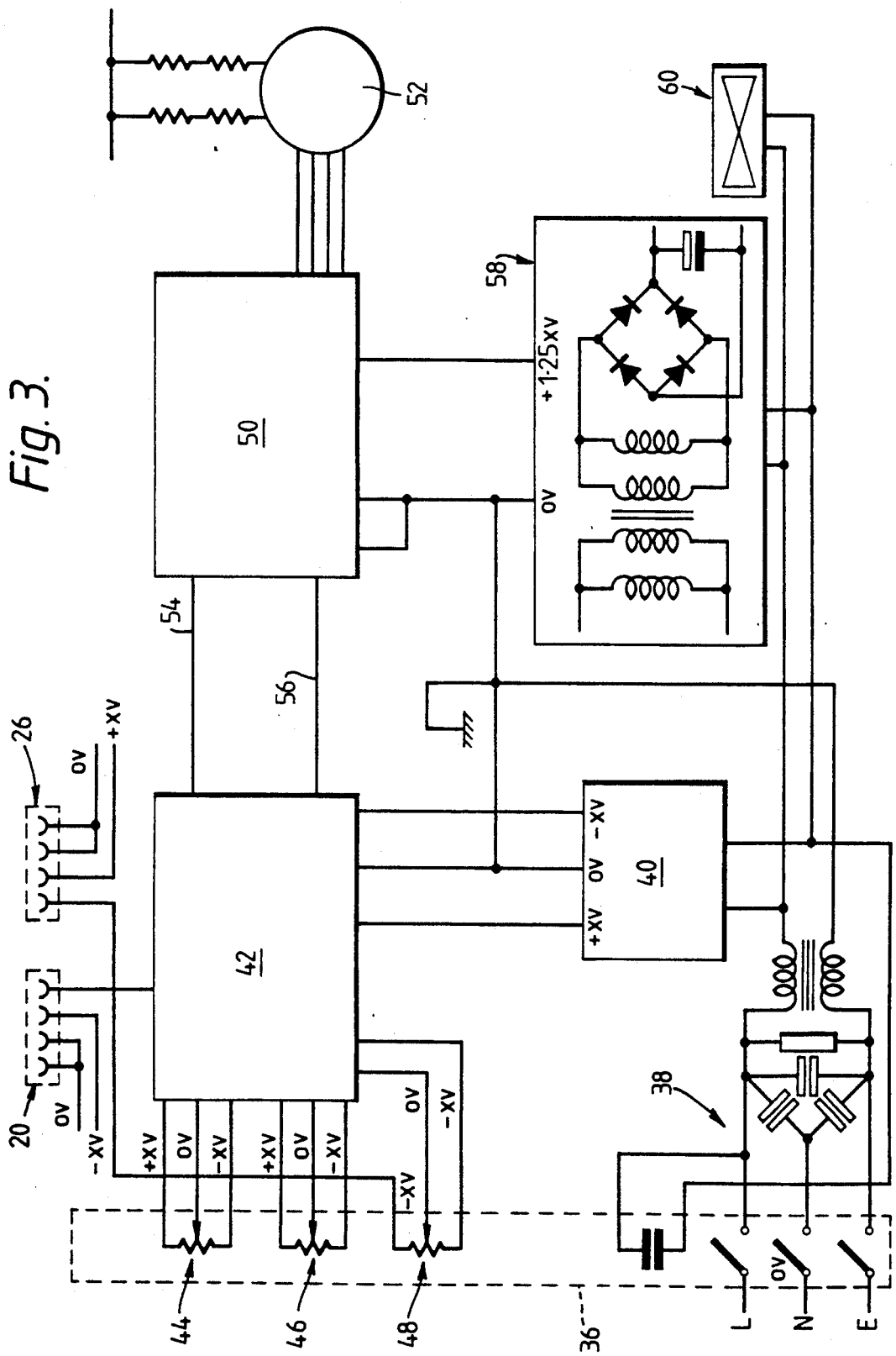
FIG. 3 a block circuit diagram which is incorporated in the machine tool of FIG. 1.

Referring now to FIG. 3. The front panel 36 of the control box 34 is depicted diagrammatically by broken lines. A mains electrical supply input is indicated generally by the numeral 38. A power supply unit 40 transforms, rectifies and smoothes the input from the mains supply 38, prior to passing it to a control board in box 34 and which will be described in more detail later on in this specification. What is shown in FIG. 3 however, is that the controls for the transducers 20 and 26 connect thereto. Thus, a pair of zero setting potentiometers 44 and 46 enable adjustment of the voltage values of the transducers 20 and 26 when the electrodes 10 are aligned in their desired start positions, centrally of their intended reciprocatory paths.

A further potentiometer 48 enables the desired taper angle to be selected, by way of determining those voltages which when achieved, will result in signals being produced which in turn will cause the direction of movement of the comb 12 to reverse.

The signals so derived, are passed via line 54 to a motor drive unit 50, which is powered by a supply 58. The motor drive unit 50 then causes a stepper motor 52 to rotate in one direction or another and so rotate the cam 28 (FIG. 1). Lateral movement of the comb 12 (FIG. 1) is thus achieved. A motor drive cooling fan 60 is also provided.

Figure 4:
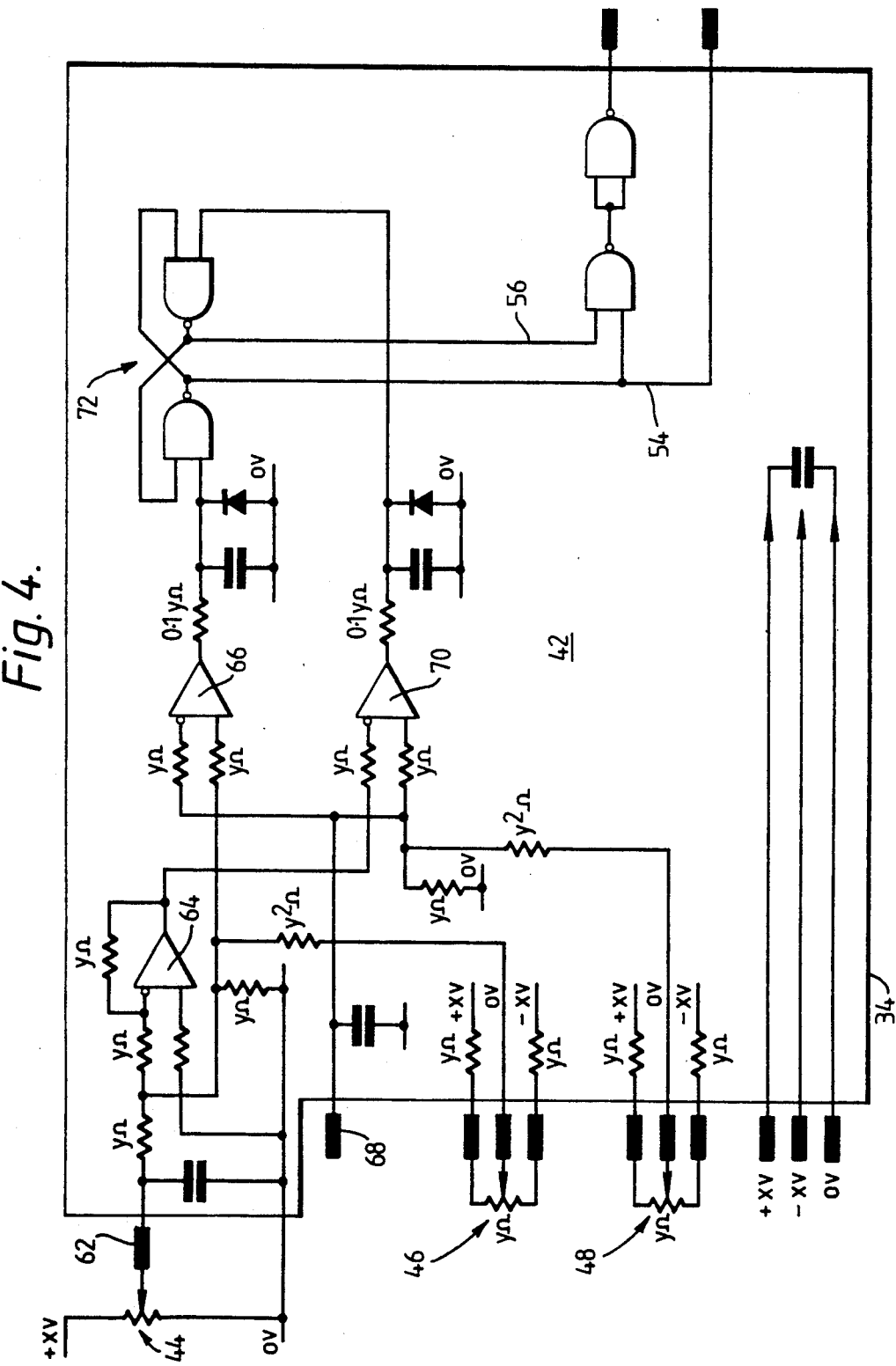
FIG. 4 electrical circuit contained within one of the blocks in FIG. 3.

Referring now to FIG. 4. The control board in the box 34 comprises a circuit wherein the input signal 62 of the transducer 20 is divided such that one part thereof goes to an amplifier 64 and the other part to a comparator 66.

The input signal 68 of the transducer 26 is also divided such that one part goes to the comparator 66 and the other part goes to a further comparator 70. The output from the amplifier 64 is also connected to the further comparator 70.

The outputs from both comparators 66 and 70 go to respective sides of a latch here shown as a cross coupled latch 72. This, when triggered, sends signals via line 54 to the motor drive unit 50 or along lines 54 and 56 to the start/stop control therein, as appropriate.

The letter 'X' is used to denote points of equal voltage, or said equal voltage plus portions thereof, which may be positive or negative as indicated by the appropriate associated mathematical sign. Similarly 'y' denotes points of equal resistance, or portions thereof.

Although the invention has been described in connection with the use of a plurality of electrodes to produce a corresponding number of tapered apertures, the invention is equally efficacious where only one such aperture is required. In that case, only one electrode would be utilized.

Again, whilst the example given relates to an electro erosion process, the invention is equally applicable to the electro chemical machinery process and to some metal cutting processes e.g. wherein an end mill is used, or any other cutting tool which is capable of cutting when moved in more than one direction.

In an alternative embodiment of the present invention, when the signals from both transducers coincide at zero, the signal which results,, instead of disabling the entire apparatus, can be utilized merely to disable the motor 52. Thus only the reciprocatory movement is stopped. The electrodes 10 however, may still traverse downwards and this enables a straight portion to be formed at the apex of the slot, provided of course, that the metal of the workpiece has sufficient thickness.

Figure 5:
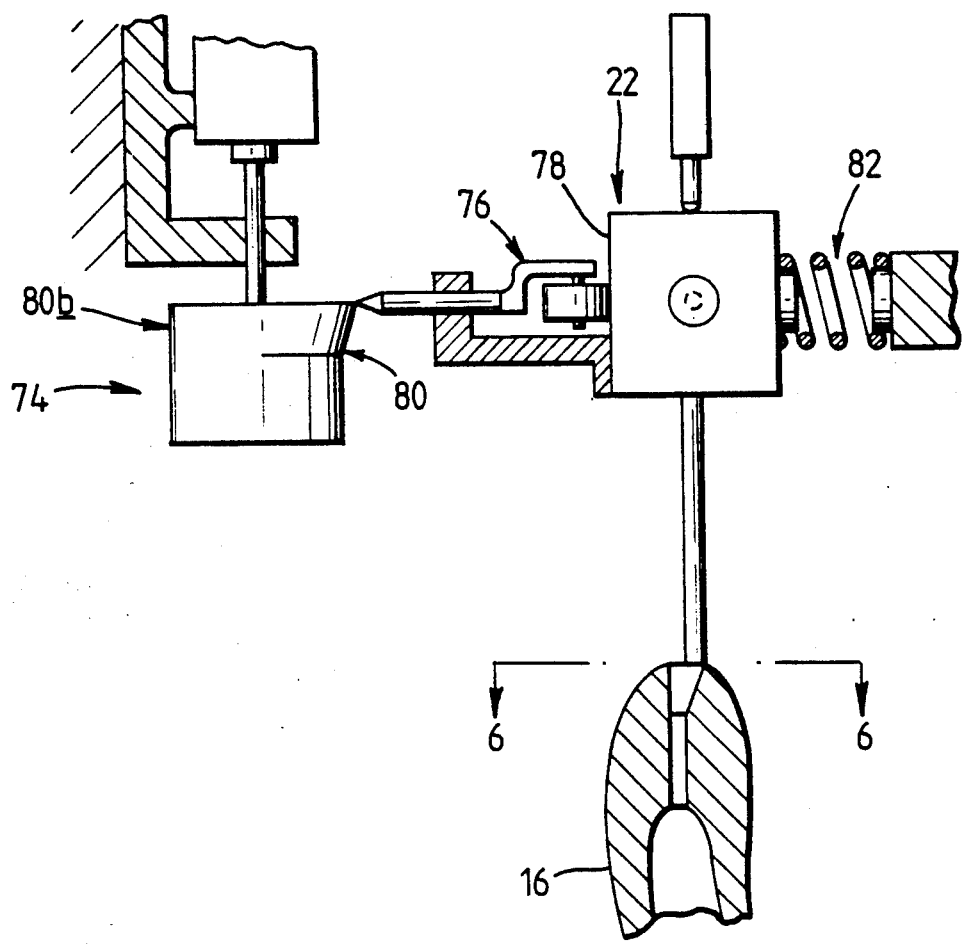
FIG. 5 depicts a further embodiment of the present invention.

Referring now to FIG. 5. It may be desired to widen some portion of the slot 14 e.g. at its mouth. This can be achieved by displacing the tool holder 22 and therefor the tool or tools 10, in a direction laterally of the direction of reciprocations.

A cam 74 is mounted for rotation about a vertical axis. A follower 76 bridges the gap between the cam 74 and a vertical face of the tool holder 22.

The mechanism is set up so that on a first half cycle of the reciprocation of the tool 10, the cam 74 is rotated whilst the follower engages a plain half cylindrical portion 80b on the cam 74. On the return half cycle of the reciprocation, the follower engages a half elliptical portion 80 on the cam 74, thus displacing the tool holder 22 to the right as viewed in the drawing. The displacement proceeds to a maximum as shown in the drawing, whereafter, a spring 82 acts on the tool holder 22, to push the follower 76 back down the now receding half ellipse of the portion 80.

The cam profile 80 is depicted as being frusto conical for a part of its length. This is merely by way of illustration. Any part or all of the vertical length of the profile 80 can be frusto conical depending on design requirements.

Again, in the example, a slot 14 is formed which is tapered in two planes, for a part of its length, and in one plane for the remainder thereof.

Figure 6:
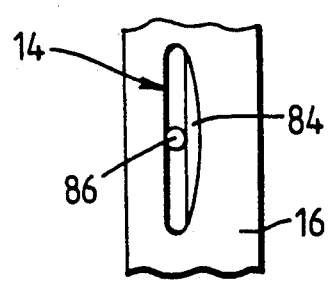
FIG. 6 view in the direction of arrows 6—6 in FIG. 5.

FIG. 6 depicts both the profile of the edge 84 of the mouth of the slot 14, and the circular profile 86 produced at breakthrough of the electrode tool 10.

We claim:

1. A method of forming a tapered slot in a workpiece comprising the steps of moving a tool into the workpiece to achieve a desired depth and at the same time causing relative reciprocatory movement between the tool and the workpiece in directions laterally of the direction of movement of the tool into the workpiece and deriving electrical signals from said movements and wherein the signals derived from movement of the tool into the workpiece constantly reduce in magnitude, comparing said signals with each other and when the signals derived from said lateral movement have a value equal to the value of the signals derived from the movement of the tool into the workpiece or equal to a corresponding negative value thereof, deriving a further signal therefrom and utilizing said further signal to effect a reversal in the direction of said lateral movement between the workpiece and the tool.

2. A method of forming a tapered slot in a workpiece as claimed in claim 1 wherein the tool is reciprocated in directions normal to the direction of movement of the tool into the workpiece.

3. A method of forming a tapered slot in a workpiece as claimed in claim 1 including the step of utilizing transducers for the deriving of said electrical signals and arranging a first said transducer in engagement with tool holding means, such that movement of the tool holder and therefore the tool towards the workpiece results in said first transducer emitting signals of changing magnitude, and arranging a second transducer in engagement with the tool holding means or effectively the workpiece such that said relative reciprocatory movements between the tool holder and workpiece results in said second transducer emitting signals the magnitude of which rises to a maximum rise on one half reciprocation and falls to a maximum fall on the following half reciprocation, said maximum rise and said maximum fall being dictated by the magnitude of said signals being emitted by said first transducer.

4. A method of forming a tapered slot in a workpiece as claimed in claim 1 and including the step of directing said further signal to the motor of a motor driven cam so as to cause said motor to rotate the cam in one direction or in an opposite direction to react on said tool holder by causing said tool holder to reciprocate, or so as to disable said motor.

5. A method of forming a tapered slot as claimed in claim 1 including the step of causing the tool to move on a curved path on at least one half reciprocation so as to effect a widening of the slot.

6. Tapered slot forming apparatus comprising a tool holder and tool which in operation are movable towards a workpiece, first signal generating means adapted to produce a signal of reducing magnitude on said movement occurring, said tool holder further being capable of reciprocating movement relative to and laterally of a said work-piece, second signal generating means adapted to produce positive and negative signals on alternate relative half reciprocations of said tool holder, the maximum numerical magnitude reached by said positive and negative signals being equal to the signals produced by said first signal generating means, means for monitoring said positive and negative signals relative to said reducing signal and adapted so as to emit a signal on noting numerical equality therebetween and further means actuated by said emitted signal to either reverse the direction of relative lateral movement of the tool holder or to disable the machine tool thereby.

7. Tapered slot forming apparatus as claimed in claim 6 wherein the first and second signal generating means comprise telescopic transducers of a kind which emit voltage signals which respectively are representative of the magnitude of movement of the tool holder towards and laterally of said workpiece.

8. Tapered slot forming apparatus as claimed in claim 6 wherein the monitoring means comprises a pair of comparators which in operation compare the signals produced by the second signal generating means with the signal produced by the first signal generating means, and the further means to which signals from said comparators pass comprises a bistable latch which is connected to and actuates or disables a stepper motor which is connected to a rotary cam which moves said tool holder laterally of said workpiece.

9. Tapered slot forming apparatus as claimed in claim 6 including a further cam and a follower one end of which engages a vertical face of the tool holder and the other end thereof engages the further cam, the profile of the further cam being such as to cause displacement of the tool laterally of its reciprocatory path, during at least one half reciprocation.

10. Tapered slot forming apparatus as claimed in claim 9 wherein at least a portion of said profile of said further cam is a frusto conical profile.

* * * * *